US010635798B2

United States Patent
Lee et al.

(10) Patent No.: US 10,635,798 B2
(45) Date of Patent: *Apr. 28, 2020

(54) DIGITAL DEVICE AND BIOMETRIC AUTHENTICATION METHOD THEREIN

(71) Applicant: LG ELECTRONICS INC., Seoul (KR)

(72) Inventors: Chaedeok Lee, Seoul (KR); Seonghong Park, Seoul (KR); Junhak Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 54 days.

This patent is subject to a terminal disclaimer.

(21) Appl. No.: 15/875,433

(22) Filed: Jan. 19, 2018

(65) Prior Publication Data

US 2019/0087555 A1 Mar. 21, 2019

(30) Foreign Application Priority Data

Sep. 15, 2017 (KR) .................. 10-2017-0118611

(51) Int. Cl.
*G06F 21/31* (2013.01)
*G06F 21/32* (2013.01)
(Continued)

(52) U.S. Cl.
CPC .............. *G06F 21/32* (2013.01); *G01S 11/00* (2013.01); *G06F 21/83* (2013.01);
(Continued)

(58) Field of Classification Search
CPC ................ G06F 21/32; G06K 9/00087; G06K 2009/0006; G06K 2009/00932;
(Continued)

(56) References Cited

U.S. PATENT DOCUMENTS 5,131,412 A * 7/1992 Rankin ................. A61F 5/3761
128/869
5,899,863 A * 5/1999 Hatfield .................... A61B 8/06
128/916

(Continued)

FOREIGN PATENT DOCUMENTS

KR 10-2003-0017457 A 3/2003
KR 10-2003-0093464 A 12/2003
(Continued)

*Primary Examiner* — Philip P. Dang
(74) *Attorney, Agent, or Firm* — Birch, Stewart, Kolasch & Birch, LLP

(57) ABSTRACT

A digital device including a camera unit; a display unit; and a controller configured to in response to a request to execute a first application on the digital device having a first security authentication level, control the camera unit to capture face image data of a target and perform a first authentication process by comparing the captured face image data with prestored face image data; and in response to a request to execute a second application on the digital device having a second security authentication level more secure than the first authentication level, control the camera unit to capture vein image data of a particular body part of the target, and perform the first authentication process and a second authentication process by comparing the captured vein image data with prestored vein image data.

14 Claims, 13 Drawing Sheets

(51) Int. Cl.
| | |
|---|---|
| *H04L 9/32* | (2006.01) |
| *G06K 9/00* | (2006.01) |
| *H04N 5/33* | (2006.01) |
| *H04N 5/232* | (2006.01) |
| *G06K 9/20* | (2006.01) |
| *G06F 21/83* | (2013.01) |
| *H04N 5/247* | (2006.01) |
| *H04N 9/04* | (2006.01) |
| *G01S 11/00* | (2006.01) |
| *G06Q 20/40* | (2012.01) |
| *G01S 17/88* | (2006.01) |

(52) U.S. Cl.
CPC ..... *G06K 9/00221* (2013.01); *G06K 9/00892* (2013.01); *G06K 9/2018* (2013.01); *H04L 9/3231* (2013.01); *H04N 5/232* (2013.01); *H04N 5/23212* (2013.01); *H04N 5/247* (2013.01); *H04N 5/33* (2013.01); *H04N 9/045* (2013.01); *G01S 17/88* (2013.01); *G06F 2221/2113* (2013.01); *G06K 9/00288* (2013.01); *G06Q 20/40145* (2013.01)

(58) Field of Classification Search
CPC ........... G06K 9/00033; G06K 9/00288; G06K 9/00255; H04N 5/33; H04N 5/2256; H04N 5/23212
See application file for complete search history.

(56) References Cited

U.S. PATENT DOCUMENTS

| | | | | | |
|---|---|---|---|---|---|
| 6,311,085 | B1* | 10/2001 | Meaney | ................. | A61B 5/055 600/420 |
| 6,488,377 | B2* | 12/2002 | Matsumoto | ........... | A61B 3/145 351/206 |
| 7,550,707 | B2* | 6/2009 | Hashimoto | ................ | G06K 9/20 250/221 |
| 7,944,498 | B2* | 5/2011 | Sung | ........................ | G02B 7/38 348/252 |
| 8,204,476 | B2* | 6/2012 | Morimoto | .......... | G06K 9/00033 382/115 |
| 8,223,199 | B2* | 7/2012 | Kiyomizu | ................ | G06K 9/00 348/61 |
| 8,280,484 | B2* | 10/2012 | Boyden | .............. | A61B 5/02007 356/432 |
| 8,488,050 | B2* | 7/2013 | Ueda | ...................... | G03B 13/36 348/333.04 |
| 8,724,857 | B2* | 5/2014 | Derakhshani | ...... | G06K 9/00597 382/117 |
| 8,811,690 | B2* | 8/2014 | Dumont | ................... | G06K 9/00 382/127 |
| 8,839,720 | B2* | 9/2014 | Stewart | ................. | F41A 17/066 102/301 |
| 8,850,535 | B2* | 9/2014 | Liberman | ............. | H04L 9/3231 726/6 |
| 8,850,536 | B2* | 9/2014 | Liberman | ............. | H04L 9/0866 713/186 |
| 8,995,726 | B2* | 3/2015 | Amano | .............. | G06K 9/00885 382/115 |
| 9,100,825 | B2* | 8/2015 | Schultz | ................. | H04W 12/06 |
| 9,323,912 | B2* | 4/2016 | Schultz | ................... | G06F 21/32 |
| 9,345,427 | B2* | 5/2016 | Wood | .................. | A61B 5/0059 |
| 9,408,530 | B2* | 8/2016 | Ferren | .................... | A61B 1/041 |
| 9,417,188 | B2* | 8/2016 | Ishihara | ............... | A61B 1/00009 |
| 9,553,859 | B2* | 1/2017 | Slaby | ..................... | H04L 63/08 |
| 9,588,046 | B2* | 3/2017 | Ishihara | ............. | A61B 1/00009 |
| 9,672,471 | B2* | 6/2017 | Boyden | ............. | A61B 5/02007 |
| 9,805,214 | B2* | 10/2017 | Sahu | .................. | H04W 12/0013 |
| 9,811,299 | B2* | 11/2017 | Nobutani | ................ | G06F 21/32 |
| 10,002,242 | B2* | 6/2018 | Jakobsson | ........... | H04L 63/0861 |
| 10,007,831 | B2* | 6/2018 | Semba | ................. | G06K 9/00087 |
| 10,028,676 | B2* | 7/2018 | Freeman | ................ | G16H 50/20 |
| 10,121,059 | B2* | 11/2018 | Yoo | ..................... | G06K 9/00228 |
| 10,201,425 | B2* | 2/2019 | Ku | ........................ | A61F 2/2475 |
| 2007/0038118 | A1* | 2/2007 | DePue | ................. | A61B 5/1171 600/476 |
| 2008/0107309 | A1* | 5/2008 | Cerni | ................. | G06K 9/00033 382/115 |
| 2008/0211627 | A1 | 9/2008 | Shinzaki | | |
| 2008/0317293 | A1* | 12/2008 | Sakurai | ............. | G06K 9/00013 382/115 |
| 2009/0214083 | A1 | 8/2009 | Sato | | |
| 2009/0304237 | A1* | 12/2009 | Yoshikawa | .......... | A61B 5/1172 382/116 |
| 2012/0194662 | A1* | 8/2012 | Zhang | ................ | G06K 9/00033 348/77 |
| 2012/0300989 | A1* | 11/2012 | Nakashima | ........ | G06K 9/00046 382/115 |
| 2014/0366128 | A1 | 12/2014 | Venkateswaran et al. | | |
| 2016/0004917 | A1* | 1/2016 | Yoshida | ................. | A61B 90/36 382/115 |
| 2017/0011210 | A1* | 1/2017 | Cheong | ................ | A61B 5/0022 |
| 2017/0206332 | A1* | 7/2017 | Piccin | .................... | G16H 50/30 |
| 2018/0014734 | A1* | 1/2018 | Rogers | ................ | A61B 5/0048 |
| 2018/0045918 | A1* | 2/2018 | Seo | ........................ | G02B 9/60 |

FOREIGN PATENT DOCUMENTS

| | | |
|---|---|---|
| KR | 10-2004-0048114 A | 6/2004 |
| KR | 10-1550206 B1 | 9/2015 |
| KR | 10-2016-0099869 A | 8/2016 |
| KR | 10-2017-0045944 A | 4/2017 |

\* cited by examiner

DIGITAL DEVICE AND BIOMETRIC AUTHENTICATION METHOD THEREIN

Pursuant to 35 U.S.C. § 119(a), this application claims the benefit of earlier filing date and right of priority to Korean Application No. 10-2017-0118611, filed on Sep. 15, 2017, the contents of which are hereby incorporated by reference herein in its entirety.

BACKGROUND OF THE INVENTION

Field of the Invention

The present invention relates to a digital device, and more particularly, to a digital device and biometric authentication method therein. Although the present invention is suitable for a wide scope of applications, it is particularly suitable for performing both face authentication and vein authentication of a body part.

Discussion of the Related Art

Generally, when financial transactions and the like are performed using a digital device such as a mobile terminal or the like, security authentication is required. Security authentication methods include entering a security authentication password, performing personal authentication by capturing a user's specific part such as a face, a fingerprint or the like through a camera, etc.

Yet, since such a security authentication method can be performed by others, it causes a problem of reduced safety. Recently, a digital device adopting a biometric authentication system capable of performing authentication through biometric information of vein and the like has been developed.

A digital device of processing biometric authentication can perform biometric authentication by obtaining a biometric image of a palm, a finger, or the like and analyzing unique biometric property of 'palm's vein, finger's vein or the like. Particularly, according to a vein authentication technology, infrared light of a specific wavelength is applied to a specific part of a human body, an image is photographed using an image sensor, and an image having a blood vessel pattern represented in black is then obtained. Therefore, a specific person can be authenticated by analyzing a blood vessel pattern that is different for each person.

However, since the related art vein authentication is configured with a non-contact reflective or transmissive sensor module including an image sensor and an optical system, it is difficult to downsize and reduce the cost of the sensor module. Thus, the demand for developing a digital device, which can improve safety and reliability of security authentication by performing face recognition and vein authentication of a body part using a 3-dimensional (3D) camera that can be downsized and low-priced, is rising.

SUMMARY OF THE INVENTION

Accordingly, embodiments of the present invention are directed to a digital device and biometric authentication method therein that substantially obviate one or more problems due to limitations and disadvantages of the related art.

One object of the present invention is to provide a digital device and biometric authentication method therein, by which personal authentication can be performed quickly and conveniently by extracting a vein pattern of a body part by applying ToF (time of flight) employing a near infrared light source and then using the extracted vein pattern.

Another object of the present invention is to provide a digital device and biometric authentication method therein, by which safety and reliability of security authentication can be improved by performing face authentication and vein authentication of a body part by applying ToF (time of flight) employing a near infrared light source.

Still another object of the present invention is to provide a digital device and biometric authentication method therein, by which security can be reinforced with higher accuracy by performing face authentication and vein authentication of multiple body parts according to a security level.

Technical tasks obtainable from the present invention are non-limited by the above-mentioned technical tasks. In addition, other unmentioned technical tasks can be clearly understood from the following description by those having ordinary skill in the technical field to which the present invention pertains. Additional advantages, objects, and features of the invention will be set forth in the disclosure herein as well as the accompanying drawings. Such aspects may also be appreciated by those skilled in the art based on the disclosure herein.

To achieve these and other advantages and in accordance with the purpose of the present invention, as embodied and broadly described herein, the present invention provides in one aspect a digital device, including a camera unit, an image data sensor unit sensing image data of a target captured by the camera unit, a memory unit storing face image data and vein image data of a body part for authentication, a pre-processing unit determining information of the captured target from the image data sensed by the image data sensor unit, the pre-processing unit, if the determined image data is face image data or vein data of a body part, creating processed face image data or processed body vein image data for authentication, a comparing unit comparing the processed image data with at least one of the face image data or the vein image data of the body part stored in the memory unit, and a controller, if an execution mode to be executed is a security authentication mode, activating the camera unit to be ready to receive the image data of the target, the controller, if the image data is face image data, performing a primary authentication by comparing the processed face image data with the face image data previously stored for authentication in the memory unit, the controller performing a secondary authentication by comparing the vein image data of at least one processed body part with the vein image data of at least one authentication body part previously stored for authentication in the memory unit according to a result of the primary authentication.

In another aspect, the present invention provides a digital device, including a camera unit, an image data sensor unit sensing image data of a target captured by the camera unit, a memory unit storing face image data and face vein image data for authentication, a pre-processing unit determining information of the captured target from the image data sensed by the image data sensor unit, the pre-processing unit, if the determined image data is face image data or face vein data, creating processed face image data or processed face vein image data for authentication, a comparing unit comparing the processed image data with at least one of the face image data or the face vein image data stored for authentication in the memory unit, and a controller, if an execution mode to be executed is a security authentication mode, activating the camera unit to be ready to receive the image data of the target, the controller, if the image data of the target is face image data, performing a primary authentication by comparing the processed face image data with the face image data previously stored for authentication in the memory unit, the controller performing a secondary authentication by comparing the processed face vein image data with the face vein image data stored for authentication in the memory unit according to a result of the primary authentication.

In another aspect, the present invention provides a biometric authentication method in a digital device including a memory and a camera unit, including receiving a security authentication mode command, capturing a target to authenticate by activating the camera unit, sensing image data of the captured target, determining whether the image data is face mage data, if the image data is the face image data, creating processed face image data from the face image data, primarily comparing the processed face image data with the face image data stored for authentication in the memory unit, checking a result of the primarily comparing, capturing the target to authenticate using the camera unit according to a result of the primarily comparing, sensing image data of the captured target, if the image data is vein image data of at least one body part, creating vein image data of a processed body part, secondarily comparing the vein image data of the at least one processed body part with the vein image data of the at least one authentication body part previously stored for authentication in the memory unit, and ending the security authentication mode according to a result of the secondarily comparing.

In another aspect, the present invention provides a biometric authentication method in a digital device including a memory and a camera unit, including receiving a security authentication mode command, capturing a target to authenticate by activating the camera unit, sensing image data of the captured target, determining whether the image data is face mage data or face vein image data, if the image data is the face image data or the face vein image data, creating processed face image data or processed face vein image data from the face image data or the face vein image data, primarily comparing the processed face image data with the face image data stored for authentication in the memory unit, secondarily comparing the processed face vein image data with the face vein image data previously stored for authentication in the memory unit, and ending the security authentication mode according to a result of the secondarily comparing.

In further aspect, the present invention provides a method of updating body vein data in a digital device including a memory and a camera unit, including receiving a security update mode command, capturing a target to update by activating the camera unit, sensing image data of the captured target, determining whether the image data is face mage data, if the image data is the face image data, creating processed face image data, comparing the processed face image data with face image data stored for authentication in the memory unit, capturing a target to authenticate using the camera unit, sensing image data of the captured target, if the image data is vein image data of at least one body part, creating vein image data of a processed body part, and updating the vein image data by saving the vein image data of the processed body part to the memory unit.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

Accordingly, the present invention provides the following advantages. According to one embodiment of the present invention, personal authentication can be performed quickly and conveniently by extracting a vein pattern of a body part by applying ToF (time of flight) employing a near infrared light source and then using the extracted vein pattern.

In addition, safety and reliability of security authentication can be improved by performing face authentication and vein authentication of a body part by applying ToF (time of flight) employing a near infrared light source. Further, the security can be reinforced and accuracy can be raised by performing face authentication and vein authentication of multiple body parts according to a security level.

Further, the present invention can perform personal authentication with high accuracy by obtaining 3D vein blood vessel information through depth information of a ToF sensor, compensate the inaccuracy of the related art face recognition through additional vein authentication, and apply use scenes of various types.

Effects obtainable from the present invention are not limited by the above mentioned effect. In addition, other unmentioned effects can be clearly understood from the following description by those having ordinary skill in the technical field to which the present invention pertains.

BRIEF DESCRIPTION OF THE DRAWINGS

Arrangements and embodiments may be described in detail with reference to the following drawings in which like reference numerals refer to like elements and wherein.

DETAILED DESCRIPTION OF THE INVENTION

Figure 1:
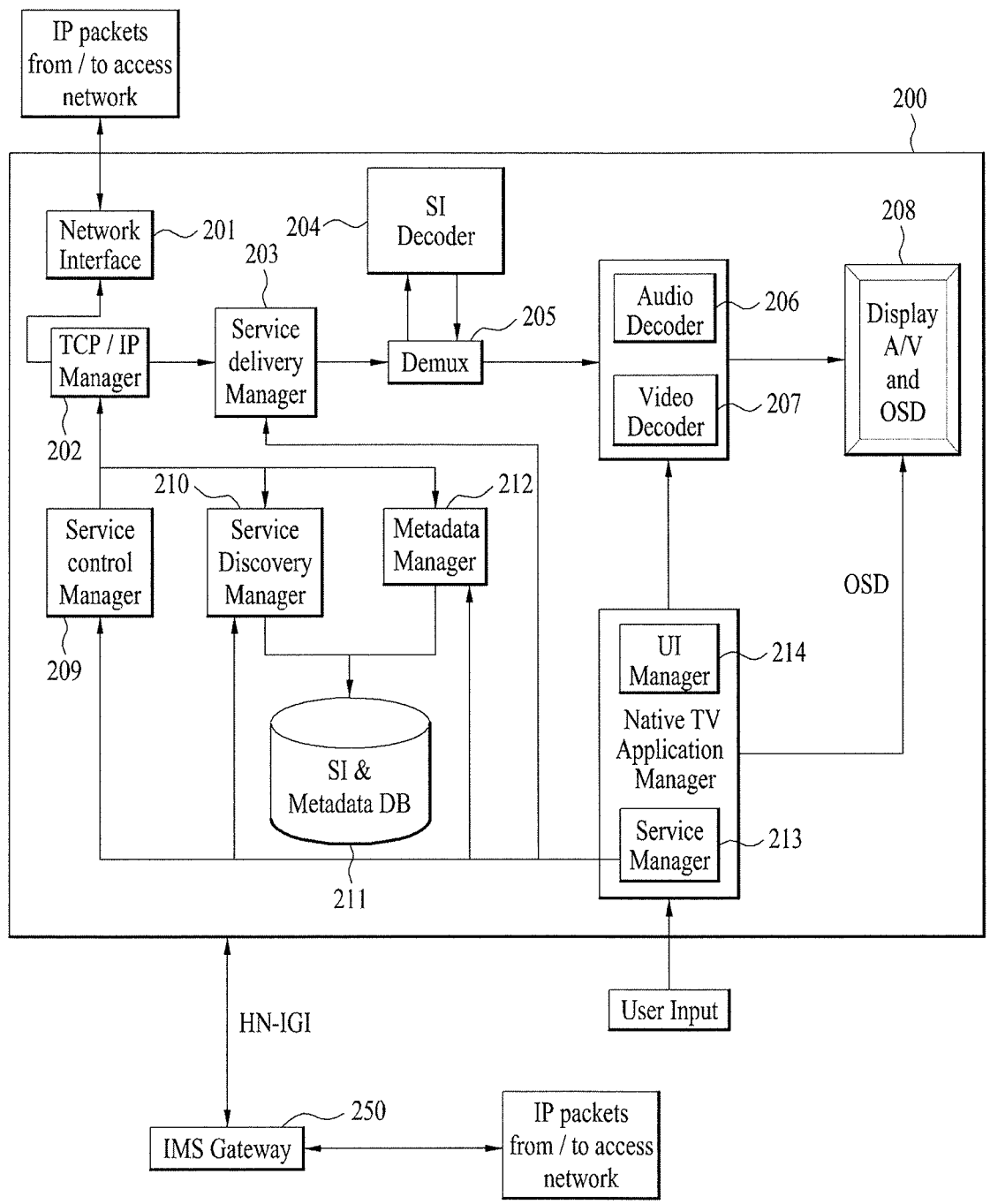
FIG. 1 is a block diagram of a digital device according to one embodiment of the present invention.

Description will now be given in detail according to exemplary embodiments disclosed herein, with reference to the accompanying drawings. In general, a suffix such as "module" and "unit" can be used to refer to elements or components. Use of such a suffix herein is merely intended to facilitate description of the specification, and the suffix itself is not intended to give any special meaning or function. In addition, such an ordinal number as 'first, 'second', 'third' and the like can have a meaning of an order. Yet, the terminologies can be used for the purpose of distinguishing one component from another component capable of being overlapped with each other.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

A digital device according to an embodiment of the present invention as set forth herein can be any device that can handle any one of transmitting, receiving, handling and outputting data, content, servicer, application, and so forth. The digital device can be connected to other digital devices through wired network or wireless network, paired or connected to external server, and through the connections, the digital device can transmit and receive the prescribed data. Examples of the digital device can include standing devices such as a network TV, a Hybrid Broadcast Broadband TV (HBBTV), a smart TV, Internet Protocol TV (IPTV), and personal computer (PC), or mobile/handheld devices such as a Personal Digital Assistant (PDA), smart phone, tablet PC, or Notebook computer. For convenience of description, in this specification, Digital TV is used in FIG. 1 and mobile device is used in FIG. 2 depicting the digital device. Further, the digital device in this specification can be referred to configuration having only a panel, set-top box (STB), or a set including the entire system.

Further, the wired or wireless network described in this specification can refer to various pairing method, standard telecommunication network protocol methods supported for transmitting and receiving data between digital devices or between digital device and external server. The wired or wireless network also includes various telecommunication network protocols supported now as well as in the future. Examples of the wired or wireless network include wired network supported by various telecommunication standard such as Universal Serial Bus (USB), Composite Video Banking Sync (CVBS), Component, S-Video (analog), Digital Visual Interface (DVI), High Definition Multimedia Interface (HDMI), RGB, D-SUB and so forth, and wireless network supported by various standards including Bluetooth, Radio Frequency Identification (RFID), infrared Data Association (IrDA), Ultra Wideband (UWB), ZigBee, Digital Living Network Alliance (DLNA), Wireless LAN (WLAN)(Wi-Fi), Wireless broadband (Wibro), World Interoperability for Microwave Access (Wimax), High Speed Downlink Packet (HSDPA), Long Term Evolution/LTE-Advanced (LTE/LTE-A), Wi-Fi direct, and so forth.

In addition, when this specification refers simply to the digital device, it can mean a standing device or a mobile device depending on the context, and when it is not referred to a specific device, the digital device referred in this specification refers to both standing and mobile device. Also, the digital device can perform intelligent functions such as receiving broadcasting program, operating computer functions, and supporting at least one external input, and by being connected through the network wired or wirelessly, the digital device can support e-mail functions, web browsing functions, banking, gaming, and executing applications. The digital device can further include an interface for any one of input or control method (hereinafter referred as "input method") supporting handwriting input, touch-screen, and space remote control.

Furthermore, the digital device can use a standard operating system (OS), however, the digital device described in this specification and the embodiments, uses Web OS. Therefore, the digital device can perform functions such as adding, deleting, amending, and updating the various services and applications for standard universal OS kernel or Linux kernel in order to construct a more user-friendly environment.

When the digital device, described above, receives and handles an external input, the external input includes external input devices described above, meaning all input method or digital devices, capable of transmitting and receiving data through wired or wireless network connected to and from the digital device. For example, the external input includes High Definition Multimedia Interface (HDMI), game devices such as PlayStation or X-Box, smart phone, tablet PC, printing device such as pocket photo, digital devices such as smart TV and blue-ray device.

The "server" referred to as in this application, includes digital device or system capable of transmitting and receiving data to and from client, and can also be referred to as a processor. For example, the server can be servers providing services such as portal server providing web page, web content or web service, advertising server providing advertising data, content server, Social Network Service (SNS) server providing SNS service, service server providing service to manufacturer, Multichannel Video Programming Distributor (MVPD) providing Video on Demand or streaming service, and service server providing pay services.

In this application, when application is described for the convenience of explanation, the meaning of application in the context can include services as well as applications. In the following description, various embodiments according to an embodiment of the present invention are explained with reference to attached drawings.

Figure 2:
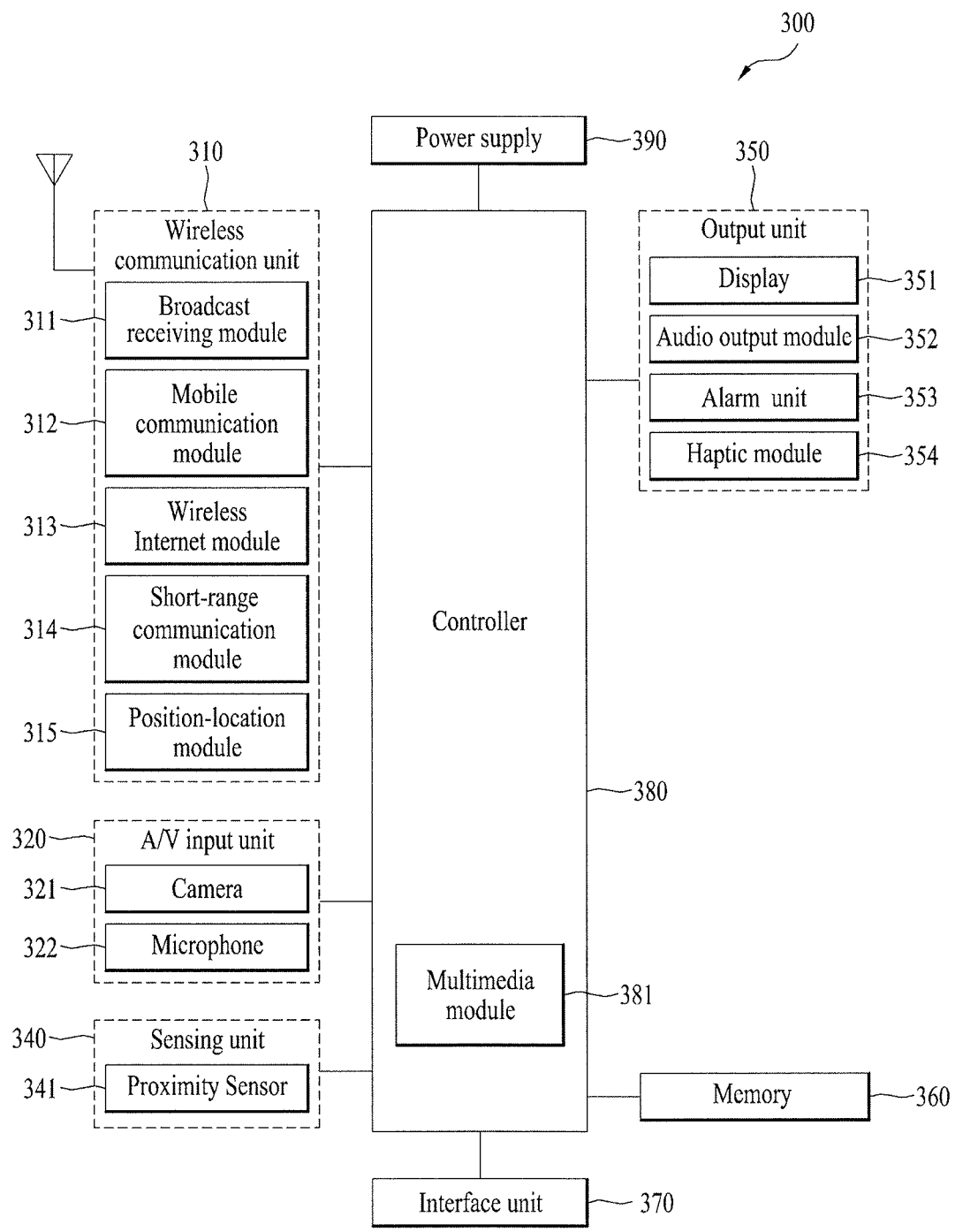
FIG. 2 is a block diagram of a digital device according to another embodiment of the present invention.

FIG. 1 is a block diagram of a digital device according to one embodiment of the present invention. The digital device 200 may include a network interface 201, a TCP/IP manager 202, a service delivery manager 203, an SI (System Information, Service Information or Signaling Information) decoder 204, a demultiplexer 205, an audio decoder 206, a video decoder 207, a display A/V and OSD (On Screen Display) module 208, a service control manager 209, a service discovery manager 210, a SI & metadata database (DB) 211, a metadata manager 212, an application manager, etc.

The network interface 201 can receive or transmit IP packets including service data through a network. In other words, the network interface 201 can receive IP packets including at least one of text data, image data, audio data, and video data, used for SNS, as well as services and applications from a server connected thereto through a network.

The TCP/IP manager 202 involves delivery of IP packets transmitted to the digital device 200 and IP packets transmitted from the digital device 200, that is, packet delivery between a source and a destination. The TCP/IP manager 202 classifies received packets according to an appropriate protocol and outputs the classified packets to the service delivery manager 205, the service discovery manager 210, the service control manager 209, and the metadata manager 212.

The service delivery manager 203 can control classification and processing of service data. The service delivery manager 203 can also control real-time streaming data, for example, using real-time protocol/real-time control protocol (RTP/RTCP). In other words, the service delivery manager 203 can parse a real-time streaming data packet, transmitted based on the RTP, according to the RTP and transmits the parsed data packet to the demultiplexer 205 or store the parsed data packet in the SI & metadata DB 211 under the control of the service manager 213. The service delivery manager 203 can feed back network reception information to the server based on the RTP.

The demultiplexer 205 can demultiplex audio data, video data, SI from a received packet through packet identifier (PID) filtering and transmit the demultiplexed data to corresponding processors, that is, the audio/video decoder 206/207 and the SI decoder 204. The SI decoder 204 can parse and/or decode SI data such as program specific information (PSI), program and system information protocol (PSIP), digital video broadcast-service information (DVB-SI), etc. The SI decoder 204 can store the parsed and/or decoded SI data in the SI & metadata DB 211. The SI data stored in the SI & metadata DB 211 can be read or extracted and used by a component which requires the SI data. EPG data can also be read from the SI & metadata DB 211. This will be described below in detail.

The audio decoder 206 and the video decoder 207 respectively can decode audio data and video data, which are demultiplexed by the demultiplexer 205. The decoded audio data and video data can be provided to the user through the display unit 208. The application manager may include a service manager 213 and a user interface (UI) manager 214, administrate the overall state of the digital device 200, provide a UI, and manage other mangers.

The UI manager 214 can receive a key input from the user and provide a graphical user interface (GUI) related to a receiver operation corresponding to the key input through OSD. The service manager 213 can control and manage service-related managers such as the service delivery manager 203, the service discovery manager 210, the service control manager 209, and the metadata manager 212.

The service manager 213 may configure a channel map and enable channel control at the request of the user based on the channel map. The service manager 213 can receive service information corresponding to channel from the SI decoder 204 and set audio/video PID of a selected channel to the demultiplexer 205 so as to control the demultiplexing procedure of the demultiplexer 205.

The service discovery manager 210 can provide information required to select a service provider that provides a service. Upon receipt of a signal for selecting a channel from the service manager 213, the service discovery manager 210 discovers a service based on the received signal. The service control manager 209 can select and control a service. For example, the service control manager 209 can perform service selection and control using IGMP (Internet Group Management Protocol) or real time streaming protocol (RTSP) when the user selects a live broadcast service and using RTSP when the user selects a video on demand (VOD) service.

The metadata manager 212 can manage metadata regarding services and store metadata in the SI & metadata DB 211. The SI & metadata DB 211 can store SI data decoded by the SI decoder 204, metadata managed by the metadata manager 212, and information required to select a service provider, which is provided by the service discovery manager 210. In addition, the SI & metadata DB 211 can store system set-up data. The SI & metadata DB 211 can be implemented using a Non-Volatile RAM (NVRAM) or a Flash memory, and the like. An IMS (IP Multimedia Subsystem) gateway 250 may include functions required to access an IMS based IPTV services.

Next, FIG. 2 is a block diagram of a digital device according to another embodiment of the present invention. In particular, FIG. 2 shows the mobile terminal 300 having various components, but implementing all of the illustrated components is not a requirement. More or fewer components may be implemented according to various embodiments.

With reference to FIG. 2, the mobile terminal 300 includes a wireless communication unit 310, an A/V (audio/video) input unit 320, a user input unit 330, a sensing unit 340, an output unit 350, a memory 360, an interface unit 370, a controller 380, and a power supply unit 390. The detailed description of each component is as follows.

The wireless communication unit 310 typically includes one or more components which permit wireless communication between the mobile terminal 300 and a wireless communication system or network within which the mobile terminal 300 is located. For instance, the wireless communication unit 310 can include a broadcast receiving module 311, a mobile communication module 312, a wireless Internet module 313, a short-range communication module 314, and a position-location module 315.

The broadcast receiving module 311 receives a broadcast signal and/or broadcast associated information from an external broadcast managing server via a broadcast channel. The broadcast channel may include a satellite channel and a terrestrial channel. At least two broadcast receiving modules 311 can be provided in the mobile terminal 300 to facilitate simultaneous reception of at least two broadcast channels or broadcast channel switching.

The broadcast associated information includes information associated with a broadcast channel, a broadcast program, or a broadcast service provider. Furthermore, the broadcast associated information can be provided via a mobile communication network. In this instance, the broadcast associated information can be received by the mobile communication module 312.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 311 may be configured to receive broadcast signals transmitted from various types of broadcast systems. By non-limiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 311 can be configured to be suitable for other broadcasting systems as well as the above-noted digital broadcasting systems. The broadcast signal and/or broadcast associated information received by the broadcast receiving module 311 can be stored in a suitable device, such as the memory 360.

The mobile communication module 312 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals can carry audio, video, and data according to text/multimedia messages.

The wireless Internet module 313 supports Internet access for the mobile terminal 300. This module may be internally or externally coupled to the mobile terminal 300. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

The short-range communication module 314 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few. The position-location module 315 identifies or otherwise obtains the location of the mobile terminal 100. According to one embodiment, this module may be implemented with a global positioning system (GPS) module.

The audio/video (A/V) input unit 320 is configured to provide audio or video signal input to the mobile terminal 300. As shown, the A/V input unit 320 includes a camera 321 and a microphone 322. The camera 321 receives and processes image frames of still pictures or video, which are obtained by an image sensor in a video call mode or a photographing mode. Furthermore, the processed image frames can be displayed on the display 351.

The image frames processed by the camera 321 can be stored in the memory 360 or can be transmitted to an external recipient via the wireless communication unit 310. Optionally, at least two cameras 321 can be provided in the mobile terminal 300 according to the environment of usage. The microphone 322 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 312 in a call mode. The microphone 322 typically includes assorted noise removing algorithms to remove noise generated in the course of receiving the external audio signal. The user input unit 330 generates input data responsive to user manipulation of an associated input device or devices. Examples of such devices include a keypad, a dome switch, a touchpad (e.g., static pressure/capacitance), a jog wheel, and a jog switch.

The sensing unit 340 provides sensing signals for controlling operations of the mobile terminal 300 using status measurements of various aspects of the mobile terminal. For instance, the sensing unit 340 can detect an open/closed status of the mobile terminal 100, the relative positioning of components (e.g., a display and keypad) of the mobile terminal 300, a change of position (or location) of the mobile terminal 300 or a component of the mobile terminal 300, a presence or absence of user contact with the mobile terminal 300, and an orientation or acceleration/deceleration of the mobile terminal 300. As an example, a mobile terminal 300 configured as a slide-type mobile terminal is considered. In this configuration, the sensing unit 340 can sense whether a sliding portion of the mobile terminal is open or closed. According to other examples, the sensing unit 340 senses the presence or absence of power provided by the power supply unit 390, and the presence or absence of a coupling or other connection between the interface unit 370 and an external device. According to one embodiment, the sensing unit 340 can include a proximity sensor 341.

The output unit 350 generates output relevant to the senses of sight, hearing, and touch. Furthermore, the output unit 350 includes the display 351, an audio output module 352, an alarm unit 353, a haptic module 354. A projector module may also be included. The display 351 is typically implemented to visually display (output) information associated with the mobile terminal 300. For instance, if the mobile terminal is operating in a phone call mode, the display will generally provide a user interface (UI) or graphical user interface (GUI) which includes information associated with placing, conducting, and terminating a phone call. As another example, if the mobile terminal 300 is in a video call mode or a photographing mode, the display 351 may additionally or alternatively display images which are associated with these modes, the UI or the GUI.

The display 351 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 300 may include one or more of such displays.

Some of the displays can be implemented in a transparent or optical transmittive type, i.e., a transparent display. A representative example of the transparent display is the TOLED (transparent OLED). A rear configuration of the display 351 can be implemented as the optical transmittive type as well. In this configuration, a user can see an object located at the rear of a terminal body on a portion of the display 351 of the terminal body.

At least two displays 351 can be provided in the mobile terminal 300 in accordance with one embodiment of the mobile terminal 300. For instance, a plurality of displays can be arranged to be spaced apart from each other or to form a single body on a single face of the mobile terminal 300. Alternatively, a plurality of displays can be arranged on different faces of the mobile terminal 300.

If the display 351 and a sensor for detecting a touch action (hereinafter called 'touch sensor') are configured as a mutual layer structure (hereinafter called 'touch screen'), the display 351 is usable as an input device as well as an output device. In this instance, the touch sensor can be configured as a touch film, a touch sheet, or a touchpad.

The touch sensor can be configured to convert pressure applied to a specific portion of the display 351 or a variation of capacitance generated from a specific portion of the display 351 to an electronic input signal. Further, the touch sensor is configurable to detect pressure of a touch as well as a touched position or size. If a touch input is made to the touch sensor, a signal(s) corresponding to the touch input is transferred to a touch controller. The touch controller processes the signal(s) and then transfers the processed signal(s) to the controller 380. Therefore, the controller 380 is made aware when a prescribed portion of the display 351 is touched.

A proximity sensor 341 can be provided at an internal area of the mobile terminal 300 enclosed by the touch screen or around the touch screen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 341 is more durable than a contact type sensor and also has utility broader than the contact type sensor.

The proximity sensor 341 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen includes the electrostatic capacity proximity sensor, it is configured to detect the proximity of a pointer using a variation of an electric field according to the proximity of the pointer. In this configuration, the touch screen (touch sensor) can be considered as the proximity sensor.

For clarity and convenience of explanation, an action for enabling the pointer approaching the touch screen to be recognized as placed on the touch screen may be named 'proximity touch' and an action of enabling the pointer to actually come into contact with the touch screen may be named 'contact touch'. In addition, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 352 functions in various modes including a call-receiving mode, a call-placing mode, a recording mode, a voice recognition mode, and a broadcast reception mode to output audio data which is received from the wireless communication unit 310 or is stored in the memory 360. During operation, the audio output module 352 outputs audio relating to a particular function (e.g., call received, message received). The audio output module 352 may be implemented using one or more speakers, buzzers, other audio producing devices, and combinations of these devices.

The alarm unit 353 outputs a signal for announcing the occurrence of a particular event associated with the mobile terminal 300. Typical events include a call received, a message received and a touch input received. The alarm unit 353 can output a signal for announcing the event occurrence by way of vibration as well as video or audio signal. The video or audio signal can be output via the display 351 or the audio output module 352. Hence, the display 351 or the audio output module 352 can be regarded as a part of the alarm unit 353.

The haptic module 354 generates various tactile effects that can be sensed by a user. Vibration is a representative one of the tactile effects generated by the haptic module 354. The strength and pattern of the vibration generated by the haptic module 354 are controllable. For instance, different vibrations can be output by being synthesized together or can be output in sequence. The haptic module 354 can generate various tactile effects as well as the vibration. For instance, the haptic module 354 can generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device. The haptic module 354 can be implemented to enable a user to sense the tactile effect through a muscle sense of a finger or an arm as well as to transfer the tactile effect through direct contact. Optionally, at least two haptic modules 354 can be provided in the mobile terminal 300 in accordance with an embodiment of the mobile terminal 300.

The memory 360 is generally used to store various types of data to support the processing, control, and storage requirements of the mobile terminal 300. Examples of such data include program instructions for applications operating on the mobile terminal 300, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 360. Further, the data for various patterns of vibration and/or sound output in response to a touch input to the touch screen can be stored in the memory 360.

The memory 360 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 300 can operate in association with a web storage for performing a storage function of the memory 360 on the Internet.

The interface unit 370 may be implemented to couple the mobile terminal 100 with external devices. The interface unit 370 receives data from the external devices or is supplied with power and then transfers the data or power to the respective elements of the mobile terminal 300 or enables data within the mobile terminal 300 to be transferred to the external devices. The interface unit 370 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 300 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 300 via the corresponding port.

When the mobile terminal 300 is connected to an external cradle, the interface unit 370 becomes a passage for supplying the mobile terminal 300 with a power from the cradle or a passage for delivering various command signals input from the cradle by a user to the mobile terminal 300. Each of the various command signals input from the cradle or the power can operate as a signal enabling the mobile terminal 300 to recognize that it is correctly loaded in the cradle.

The controller 380 typically controls the overall operations of the mobile terminal 300. For example, the controller 380 performs the control and processing associated with voice calls, data communications, and video calls. The controller 380 may include a multimedia module 381 that provides multimedia playback. The multimedia module 381 may be configured as part of the controller 380, or implemented as a separate component. Further, the controller 380 can perform a pattern (or image) recognizing process for recognizing a writing input and a picture drawing input performed on the touch screen as characters or images, respectively.

The power supply unit 390 provides power required by various components of the mobile terminal 300. The power may be internal power, external power, or combinations of internal and external power. Various embodiments described herein may be implemented in a computer-readable medium using, for example, computer software, hardware, or some combination of computer software and hardware.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 380.

Figure 3:
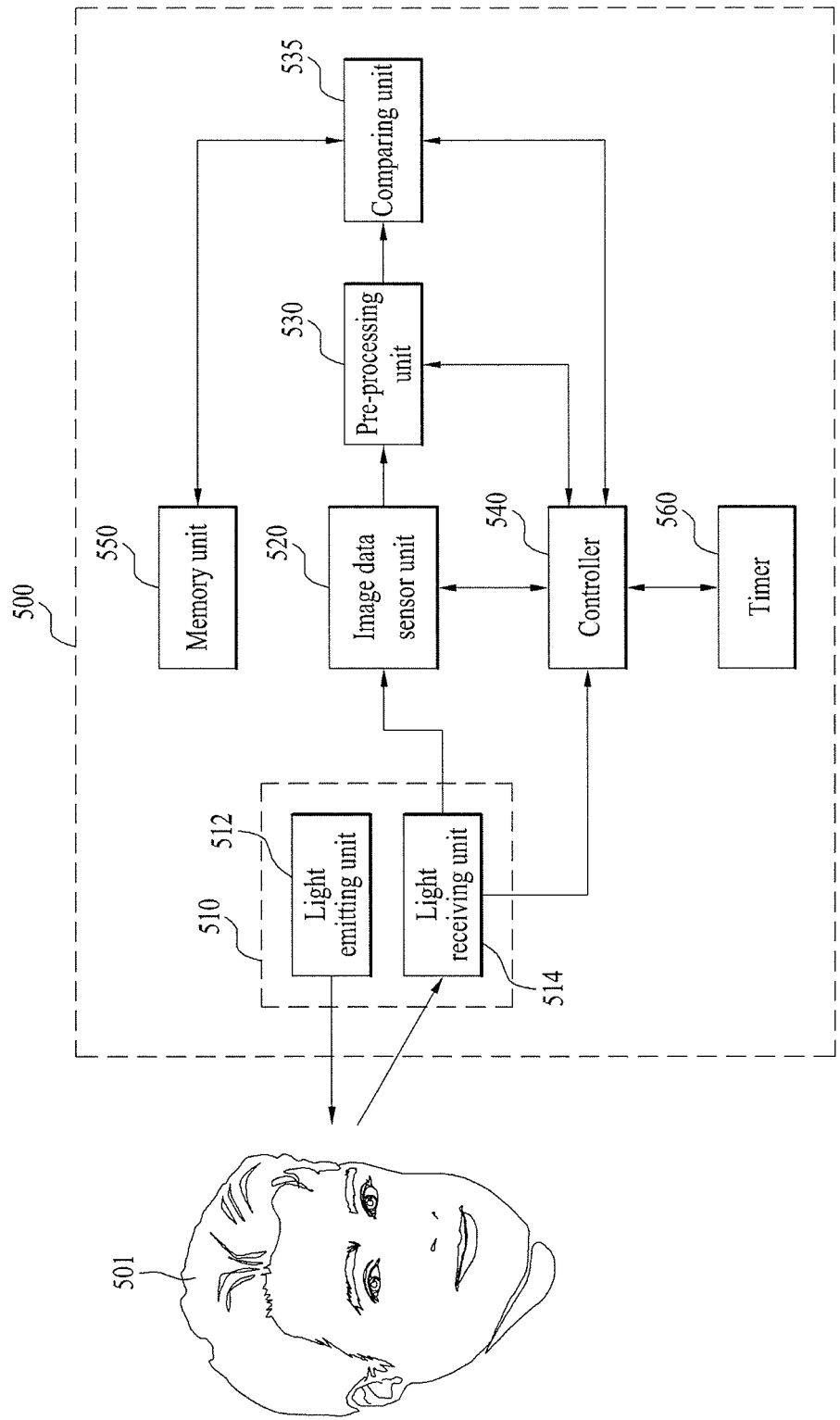
FIG. 3 is a block diagram of an image processor of a digital device according to an embodiment of the present invention.

FIG. 3 is a block diagram of a biometric authentication processor of a digital device according to an embodiment of the present invention. Referring to FIG. 3, a biometric authentication processor of a digital device 500 may include a camera unit 510, an image data sensor unit 520, a memory unit 550, a pre-processing unit 530, a comparing unit 535 and a controller 540.

In some instances, the biometric authentication processor of the digital device may further include a timer 560 and an optical guide unit. In addition, the camera unit 510 may employ a ToF sensor that uses near infrared rays (NIR). The ToF sensor measures a distance from a target and represents a strength of a difference of a phase signal reflecting from the target as an image form, thereby checking a vein vessel pattern of a body part.

The camera unit 510 may include a light emitting unit 512 projecting light onto a target 501 and a light receiving unit 514 detecting light reflecting from the target 501. In one example, the light emitting unit 512 may include a light source projecting light corresponding to an infrared region of a light spectrum.

In another example, the light emitting unit 512 can project color light corresponding to a visible region of the light spectrum and infrared light corresponding to an infrared region of the light spectrum. In addition, the light source projecting the color light may include a red light source projecting red light of a red wavelength range, a green light source projecting green light of a green wavelength range, and a blue light source projecting blue light of a blue wavelength range.

In addition, each of the red, green and blue light sources can use a light-emitting diode (LED) or a laser diode (LD). Also, the light receiving unit 514 may include a lens unit, a filter unit and a detecting unit. Further, the lens unit can transmit or focus the infrared light reflecting from the target 501.

Also, the lens unit can move centering on the detecting unit in response to an auto focus control signal of the controller. In some instances, the lens unit can use a wideband coating lens capable of transmitting a color light of a visible wavelength range and a light of an infrared wavelength range among the lights reflecting from the target 501. In another instance, the lens unit can use a lens having wideband focusing performance capable of focusing the color light and the infrared light.

The filter unit may include a single band pass filter transmitting the infrared light of the infrared (IR) wavelength range transmitted by the lens unit. In some instances, the filter unit may include a dual band pass filter simultaneously transmitting color light of red, green and blue wavelength ranges and infrared (IR) light of an infrared wavelength range, which have been transmitted by the lens unit.

Hence, the filter unit can cut off the light of the UV wavelength range, the light of the wavelength range between the red, green and blue wavelength range and the IR wavelength range, and the light of the wavelength range over the IR wavelength range. The detecting unit can detect IR light only, detect color light and IR light simultaneously, or detect color light and IR light in different time slots respectively.

In some instances, the camera unit 510 may include a first camera capturing the target 501 as a 2-dimensional (2D) image and a second camera capturing the target 501 as a 3-dimensional (3D) image. In addition, the second camera may include a light emitting unit projecting light onto the target 501 to be authenticated and a light receiving unit sensing the light reflecting from the target 501 to be authenticated.

When receiving an authentication command, the controller can control the second camera to be activated to capture a face of the target 501 to be authenticated or control the second camera to be activated to capture vein of a body part of the target 501 to be authenticated. Meanwhile, the image data sensor unit 520 can sense image data of the target 501 captured by the camera unit 510. Face image data and vein image data of a body part for authentication may be already stored in the memory unit 550.

The pre-processing unit 530 determines information of a shot target from the image data sensed by the image data sensor unit 520. If the determined image data is face data or vein data of a body part, the pre-processing unit 530 can create processed face image data or processed body vein data for authentication. In addition, the information of the shot target may include a size of a face, a shape (e.g., contour) of the face, and the like.

For example, the pre-processing unit 530 includes a detecting unit detecting an amount of light sensed from the camera unit 510, a converting unit converting the detected amount of the light into an electric signal, and an extracting unit extracting information on an image from the electric signal, thereby determining whether the shot target is a face. According to a result of the determination, the pre-processing unit 530 can create processed image data of the face and the vein of the body part.

The comparing unit 535 can compare the processed image data with at least one of the face image data and the vein image data of the body part, which were previously stored in the memory unit 550. Subsequently, if an execution mode to be executed is a security authentication mode, the controller 540 activates the camera unit 510 to be ready to receive image data of the target 501. If the image data of the target 501 is face image data, the controller 540 can perform a primary authentication by comparing the processed face image data with the face image data previously stored for authentication in the memory unit 550.

In addition, the controller 540 can perform a secondary authentication by comparing vein image data of at least one processed body part according to a primary authentication result with vein image data of at least one authentication body part previously stored in the memory unit 550. In addition, the vein image data of the processed body part may include at least one of face vein image data, wrist vein image data, hand dorsum vein image data, finger vein image data, palm vein image data, and foot vein image data, by which the present invention is non-limited.

Further, the according to a security level of an execution mode to be executed, the controller 540 can perform a primary authentication of comparing processed face image data with face image data previously stored in the memory unit 550 only. In some instances, according to a security level of an execution mode to be executed, the controller 540 can perform both a primary authentication of comparing processed face image data with face image data previously stored in the memory unit 550 and a secondary authentication of comparing vein image data of at least one processed body part with vein image data of at least one body part previously stored in the memory unit 550.

In other instances, according to a security level of an execution mode to be executed, the controller 540 can perform a primary authentication of comparing processed face image data with face image data previously stored in the memory unit, a secondary authentication of comparing vein image data of at least one processed body part with vein image data of at least one body part previously stored in the memory unit, and a tertiary authentication of comparing vein image data of at least one processed different body part with vein image data of at least one different body part previously stored in the memory unit all.

In addition, the vein image data of the processed body part may include at least one of face vein image data, wrist vein image data, hand dorsum vein image data, finger vein image data, palm vein image data, and foot vein image data, by which the present invention is non-limited.

In one example, the controller 540 checks a security level of an execution mode to be executed. If the checked security level is lower than a reference level, the controller 540 performs the primary authentication based on a face authentication image only. If the checked security level is higher than the reference level, the controller 540 performs both of the primary authentication based on a face authentication image and the secondary authentication based on a vein authentication image of a body part.

Further, when checking the security level of the execution mode to be executed, the controller 540 can provide information on the checked security level to a display screen. In another example, the controller 540 checks a security level of an execution mode to be executed. If the checked security level is a special level, the controller 540 can request an additional biometric authentication after succeeding in both of the primary and secondary authentications, control the camera unit 510 to capture a body to additionally authenticate, and perform the tertiary authentication based on an additional biometric authentication image.

In addition, the body to additionally authenticate may include at least one of face vein, wrist vein, hand dorsum vein, finger vein, palm vein, and foot vein, by which the present invention is non-limited. In some instances, after checking the security level of the execution mode to be executed, the controller 540 can provide information on the checked security level to the display screen.

In other instances, when the primary or secondary authentication is performed, if the corresponding authentication is successful, the controller 540 can provide an authentication success notification message to the display screen and also provide a next step guide message to the display screen. In other instances, when the primary or secondary authentication is performed, if the corresponding authentication is failure, the controller 540 can provide an authentication failure notification message to the display screen and also provide a re-authentication message to the display screen.

In performing the primary or secondary authentication, the controller 540 extracts an optimal authentication image from a multitude of authentication images according to an auto focus of the camera unit 510 and then calculates an error value by comparing the extracted authentication image with a previously saved registration image. If the calculated error value is within a reference range, the controller 540 can determine an authentication success.

When the optimal authentication image is extracted, if a size of the extracted authentication image is different from that of the previously saved registration image, the controller 540 can control the pre-processing unit 530 to enlarge or reduce the authentication image size. When performing the secondary authentication, the controller 540 can control the lens of the camera unit 510 to capture a vein of a body part except a face with an optical zoom and control the pre-processing unit 530 to process a vein image of the body part captured with the optimal zoom into face vein image data processed for authentication.

Further, when performing the secondary authentication, the controller 540 can control the lens of the camera unit 510 to capture face vein to authenticate with an optical zoom and control the pre-processing unit 530 to create processed face vein image data for authentication from a face vein image shot with the optical zoom. In some instances, when performing the second authentication using face vein image data, without separate shooting, the controller 540 can create processed face vein image data for authentication from face vein image data extracted from an image of a target captured for the primary authentication.

In some instances, when performing the second authentication, the controller 540 measures a projection time of IR light projected from the camera unit 510 using the timer 560. If the projection time of the IR light exceeds a reference time, the controller 540 can control the light emitting unit 512 of the camera unit 510 to cut off the output of the IR light. The output of the IR light is cutoff to solve the eye-safety problem. Namely, the danger due to the long-term exposure to the IR light can be reduced and safe authentication can be secured.

In other instances, when performing the second authentication, the controller 540 measures a projection time of IR light projected from the camera unit 510 using the timer 560. If the projection time of the IR light exceeds a reference time, the controller 540 can control the light emitting unit 512 of the camera unit 510 to lower the strength of an output of the IR light to be smaller than a setup value.

Meanwhile, if an execution mode to be executed is a biometric registration mode, the controller 540 performs a primary registration by activating the camera unit 510 to capture a face to register and saving a face authentication registration image created from the pre-processing unit 530 to the memory unit 550. If the primary registration is successfully performed, the controller 540 can perform a secondary registration by controlling the camera unit 510 to capture a face vein to register for authentication and then saving a face vein authentication registration image crated from the pre-processing unit 530 to the memory unit 550.

After both of the primary and secondary registrations have been successfully completed, if there is an additional biometric authentication registration request, the controller 540 can control the camera unit 510 to capture a body part to register additionally and perform a tertiary registration based on an additional biometric authentication registration image created from the pre-processing unit 530. For example, the body to additionally register may include at least one of face vein, wrist vein, hand dorsum vein, finger vein, palm vein, and foot vein, by which the present invention is non-limited.

Next, if an execution mode to be executed is an authentication registration update mode, the controller 540 performs a primary update by activating the camera unit 510 to capture a face to update registration, saving a face registration update image created from the pre-processing unit 530 to the memory unit 550, and removing a previous face registration image. If the primary update is successfully performed, the controller 540 can perform a secondary update by controlling the camera unit 510 to capture a face vein to update registration, saving a face vein registration update image crated from the pre-processing unit 530 to the memory unit 550, and removing a previous face vein registration image.

After both of the primary and secondary updates have been successfully completed, if there is an additional body registration update request, the controller 540 can control the camera unit 510 to capture a body part to additionally update registration and perform a tertiary registration based on an additional body registration update image created from the pre-processing unit 530.

In addition, the body to additionally update registration may include at least one of face vein, wrist vein, hand dorsum vein, finger vein, palm vein, and foot vein, by which the present invention is non-limited. Further, the according to the body vein data update method of the present invention, if a security update mode command is received, a target is capture by activating the camera unit and image data of the captured target is then sensed.

According to an embodiment of the present invention, it is determined whether the image data is face image data. If the image data is the face image data, processed face image data is created. Then, the processed face image data and face image data saved for authentication to the memory unit are compared with each other. Subsequently, according to an embodiment of the present invention, a target to be authenticated is captured by the camera unit depending on a result of the comparison and image data of the captured target is sensed. If the image data is vein image data of at least one body part, vein image data of a processed body part can be created, saved to the memory unit, and then updated.

Further, the present invention can include an optical guide unit configured to calculate current location information of a face to be authenticated and guide location correction for the current location information of the face. In addition, the optical guide unit may include a light source unit projecting light onto a face to be authenticated, a detecting unit detecting light reflecting from the face, and a location calculating unit calculating current location information of the face based on the detected light.

Particularly, the location calculating unit can extract coordinates of light spot points of the light detected from the detecting unit, calculate a distance value between the light spot points, and store current location information of a face including the calculated distance value. In some instances, the optical guide unit may include a speaker unit outputting audio data for guiding location correction for the current location information of the face and a display unit displaying a face image including the current location information.

In addition, the light source unit may include at least three light sources. For example, the light sources of the light source unit may be disposed by being spaced apart from each other in predetermined intervals along a periphery of the detecting unit. Further, the light sources of the light source unit can be disposed to have an angle range between 5 and 90 degrees from a surface of the optical guide unit.

Thus, the present invention can perform personal authentication quickly and conveniently by extracting a vein pattern of a body part by applying ToF (time of flight) employing a near infrared light source and then using the extracted vein pattern. In addition, the present invention can improve safety and reliability of security authentication by performing face authentication and vein authentication of a body part by applying ToF (time of flight) employing a near infrared light source.

Further, the present invention can reinforce security and raise accuracy by performing face authentication and vein authentication of multiple body parts according to a security level. Furthermore, the present invention can perform personal authentication with high accuracy by obtaining 3D vein blood vessel information through depth information of a ToF sensor, compensate the inaccuracy of the related art face recognition through additional vein authentication, and apply use scenes of various types.

Figure 4:
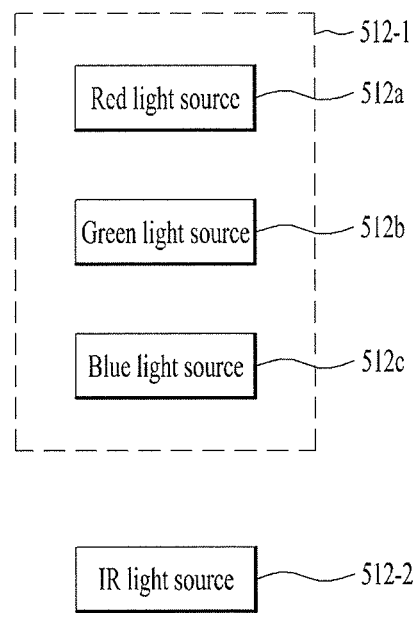
FIG. 4 is a block diagram of a light emitting unit of FIG. 3.
Figure 5:
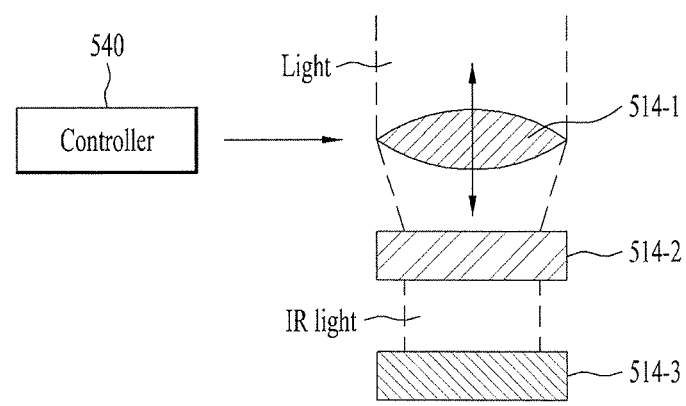
FIG. 5 is a block diagram of a light receiving unit of FIG. 3.

Next, FIG. 4 is a block diagram of the light emitting unit of FIG. 3, and FIG. 5 is a block diagram of the light receiving unit of FIG. 3. Referring to FIG. 4, the light emitting unit 512 of the camera unit may include an IR light source 512-2 projecting light corresponding to an IR region of an optical spectrum only.

In some instances, the light emitting unit can project color light corresponding to a visible region of the optical spectrum and IR light corresponding to an IR region of the optical spectrum. In addition, the light emitting unit 512 may include a color light source 512-1, which includes a red light source 512a projecting red light of a red wavelength range, a green light source 512b projecting green light of a green wavelength range, and a blue light source 512c projecting blue light of a blue wavelength range, and an IR light source 512-2 projecting IR light.

In this instance, the red light source, the green light source, the blue light source and the IR light source can use light-emitting diodes (LED) or laser diodes (LD). The light emitting unit 512 can project red light, green light and blue light simultaneously during a first time and also project IR light during a second time. The first time may be different from the second time.

Referring to FIG. 5, the light receiving unit 514 may include a lens unit 514-1, a filter unit 514-2 and a detecting unit 514-3. In addition, the lens unit 514-1 can transmit and focus IR light reflecting from the target 501. The lens unit 514-1 can move centering on the detecting unit 514-3 in response to an auto focus control signal of the controller 540.

In some instances, the lens unit 514-1 can use a wideband coating lens capable of transmitting color light of a visible wavelength range and light of an infrared wavelength range among the lights reflecting from the target 501. In another instance, the lens unit 514-1 can use a lens having wideband focusing performance capable of focusing the color light and the infrared light.

The filter unit 514-2 may include a single band pass filter transmitting the infrared light of the infrared (IR) wavelength range transmitted by the lens unit 514-1. In some instances, the filter unit 514-2 may include a dual band pass filter simultaneously transmitting color light of red, green and blue wavelength ranges and infrared (IR) light of an infrared wavelength range, which have been transmitted by the lens unit 514-1.

Hence, the filter unit 514-2 can cut off the light of the UV wavelength range, the light of the wavelength range between the red, green and blue wavelength range and the IR wavelength range, and the light of the wavelength range over the IR wavelength range. The detecting unit 514-3 can detect IR light only, detect color light and IR light simultaneously, or detect color light and IR light in different time slots respectively.

Figure 6:
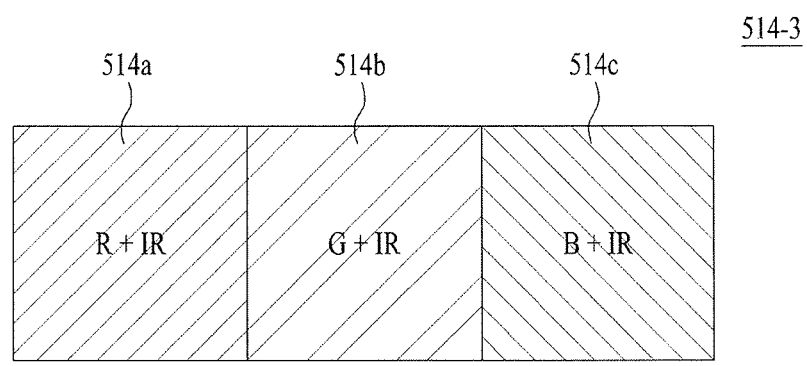
FIGS. 6 and 7 are diagrams of a detecting unit of a light receiving unit.
Figure 7:
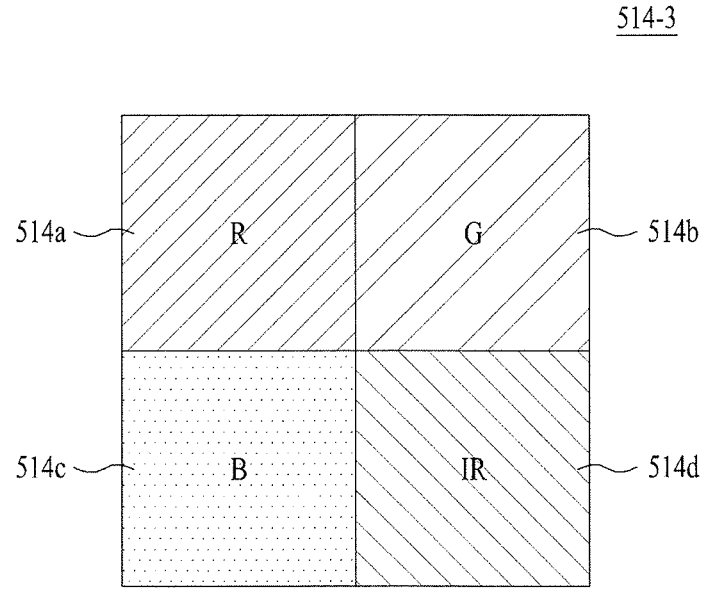

Next, FIGS. 6 and 7 are diagrams of a detecting unit of a light receiving unit. Referring to FIGS. 6 and 7, the detecting unit 514-3 can detect color light and IR light simultaneously, or detect color light and IR light in different time slots respectively. Here, as shown in FIG. 6, the detecting unit 514-3 detecting color light and IR light simultaneously may include a first pixel 514*a* simultaneously detecting red light of a red wavelength range and IR light of an IR wavelength range, a second pixel 514*b* simultaneously detecting green light of a green wavelength range and red light of a red wavelength range, and a third pixel 514*c* simultaneously detecting blue light of a blue wavelength range and IR light of an IR wavelength range.

For example, the first pixel 514*a* of the detecting unit may include a first filter capable of transmitting red light of a red wavelength range and IR light of an IR wavelength range and cutting off lights of other wavelength ranges. The second pixel 514*b* of the detecting unit may include a second filter capable of transmitting green light of a green wavelength range and IR light of an IR wavelength range and cutting off lights of other wavelength ranges.

And, the third pixel 514*c* of the detecting unit may include a third filter capable of transmitting blue light of a blue wavelength range and IR light of an IR wavelength range and cutting off lights of other wavelength ranges. Further, the as shown in FIG. 7, the detecting unit 514-3 detecting color light and IR light in different time slots respectively may include a first pixel 514*a* detecting red light of a red wavelength range, a second pixel 514*b* detecting green light of a green wavelength range, a third pixel 514*c* detecting blue light of a blue wavelength range, and a fourth pixel 514*d* detecting IR light of an IR wavelength range. Therefore, the controller can control the light emitting unit to project color light and IR light simultaneously or project color light and IR light in different time slots respectively.

Figure 8:
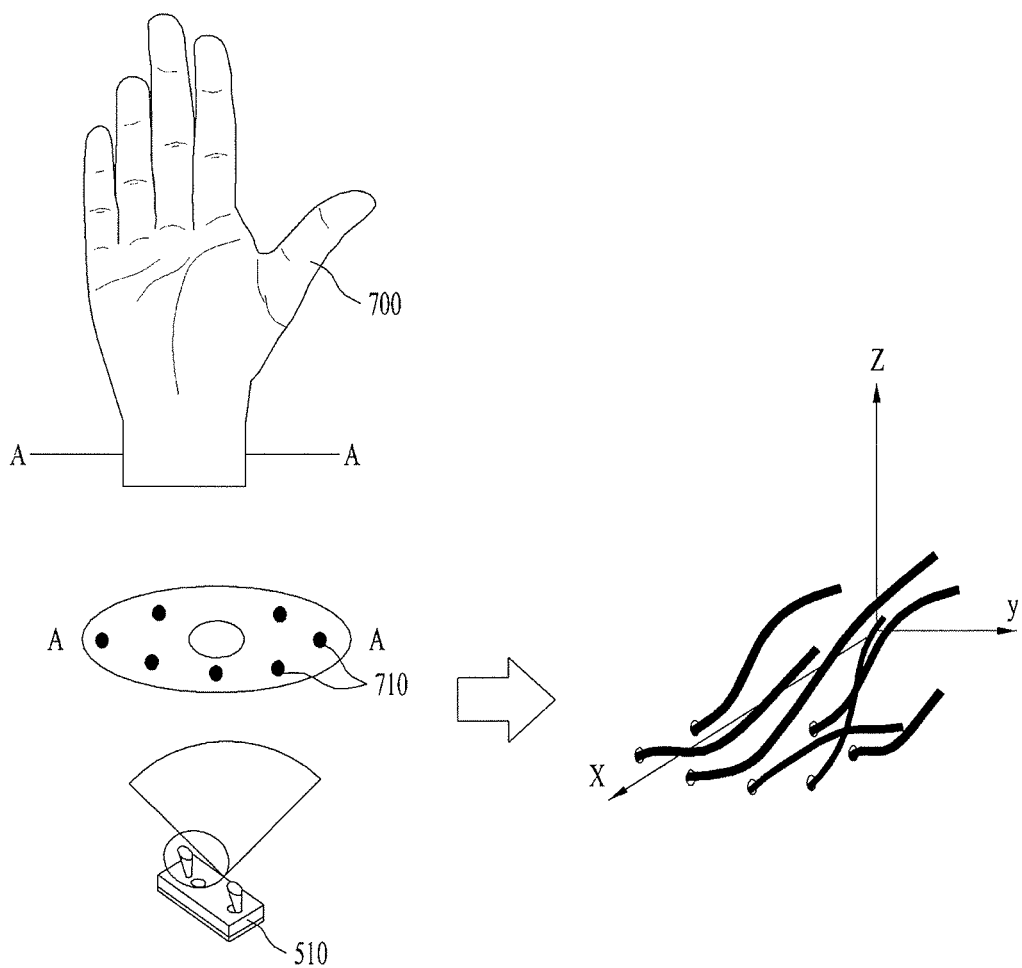
FIG. 8 is a diagram illustrating a biometric authentication method in a digital device according to an embodiment of the present invention.

FIG. 8 is a diagram illustrating a biometric authentication method in a digital device according to an embodiment of the present invention. Referring to FIG. 8, according to an embodiment of the present invention, if receiving a security authentication mode command, the digital device can capture a target to authenticate by activating the camera unit 510.

In addition, the camera unit 510 may employ a ToF sensor that uses near infrared rays (NIR). The ToF sensor is a sensor for measuring a distance from a target and represents a strength of a difference of a phase signal reflecting from the target as an image form, thereby checking a vein vessel pattern 710 of a body part 700.

In this instance, the vein vessel pattern 710 of the body part can be embodied into a 3D image by extracting depth information. The digital device can sense image data of a shot target and then determine whether the image data is face image data. If the image data is the face image data, the digital device creates processed face image data from the face image data.

Subsequently, the digital device performs a primary comparison step of comparing the processed face image data with face image data previously stored for authentication in the memory unit. The digital device checks a result of the primary comparison and then shoots a target to authenticate using the camera unit.

The digital device senses image data of the shot target. If the image data is vein image data of at least one body part, the digital device creates vein image data of a processed body part. The digital device then performs a secondary comparison step of comparing the vein image data of the at least one processed body part with vein image data of at least one authentication body part stored in the memory unit.

Subsequently, the digital device can end the security authentication mode according to a result of the second comparison. In another example, according to a biometric authentication method in a digital device, if a security authentication mode command is received, the digital device can shoot a target to authenticate by activating a camera unit, sense image data of the shot target, and determine whether the image data is face image data or face vein image data.

If the image data is the face image data or the face vein image data, the digital device can create processed face image data or processed face vein image data from the face image data or the face vein image data and then perform a primary comparison step of comparing the processed face image data with face image data stored for authentication in a memory unit.

Subsequently, the digital device can perform a secondary comparison step of comparing the processed face vein image data with the face vein image data stored for the authentication in the memory unit according to a result of the primary comparison and then end the security authentication mode according to a result of the second comparison.

Thus, the present invention can perform personal authentication quickly and conveniently by extracting a vein pattern of a body part by applying ToF (time of flight) employing a near infrared light source and then using the extracted vein pattern. And, the present invention can improve safety and reliability of security authentication by performing face authentication and vein authentication of a body part by applying ToF (time of flight) employing a near infrared light source.

A method of registering data of a face and vein data of a body part for authentication of a digital device according to an embodiment of the present invention is described as follows. First of all, the present invention can receive a security registration mode command and shoot a target to register by activating a camera unit.

Subsequently, the present invention senses image data of the shot target and then determines whether the image data is face image data and vein image data of at least one body part. If the image data is the face image data and the vein image data of the at least one body part, the present invention can create processed face image data and vein image data of at least one processed body part from the face image data and the vein image data of the at least one body part. The present invention can then register the processed face image data and the vein image data of the at least one processed body part at the memory unit.

A method of updating vein data of a body part for security authentication of a digital device according to an embodiment of the present invention is described as follows. First of all, the present invention can receive a body vein security update mode command and shoot a target to register by activating a camera unit.

Subsequently, the present invention senses image data of the shot target and then determines whether the image data is face image data. If the image data is the face image data, the present invention performs authentication by comparison with face image data previously stored in the memory. According to a result from performing the authentication, the present invention captures at least one body part of the target. If the shot image is vein image data of the at least one body part of the target, the present invention creates vein image data of at least one processed body part by processing vein image data of the body part and then saves it to the memory unit, thereby completing the update.

A method of updating face data for security authentication of a digital device according to an embodiment of the present invention is described as follows. First of all, the present invention receives a face security authentication update mode command, activates a camera unit, and captures a target to register.

Subsequently, the present invention senses image data of the shot target and determines whether the image data is vein image data of at least one body part of the target. If the image data is the vein image data of the body part, the present invention performs authentication by comparing the image data with vein image data of the corresponding body part of the target previously stored in the memory and then saves face data of the target to the memory unit according to a result from performing the authentication, thereby completing the update. In some instances, a procedure for performing authentication by comparison with vein image data of a body part of a target may be performed more than once.

FIGS. 9 to 14 are diagrams illustrating a method of authenticating a body part according to an embodiment of the present invention. Referring to FIGS. 9 to 14, the present invention can perform face authentication primarily, shoot vein images of various body parts, and then extract vein image data of a body part from the shot images.

Figure 9:
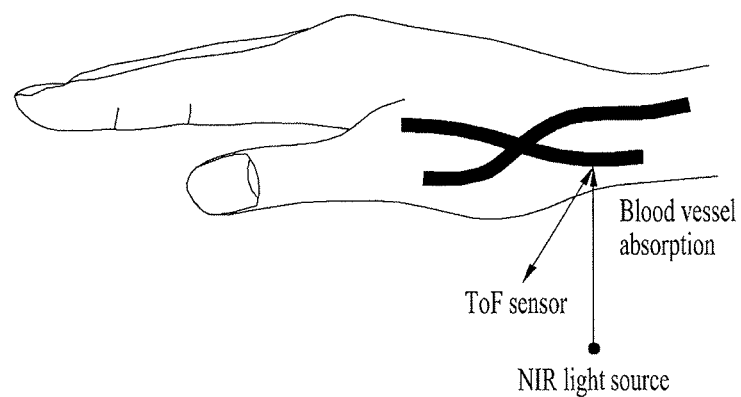
FIGS. 9 to 14 are diagrams illustrating a method of authenticating a body part according to an embodiment of the present invention.
Figure 10:
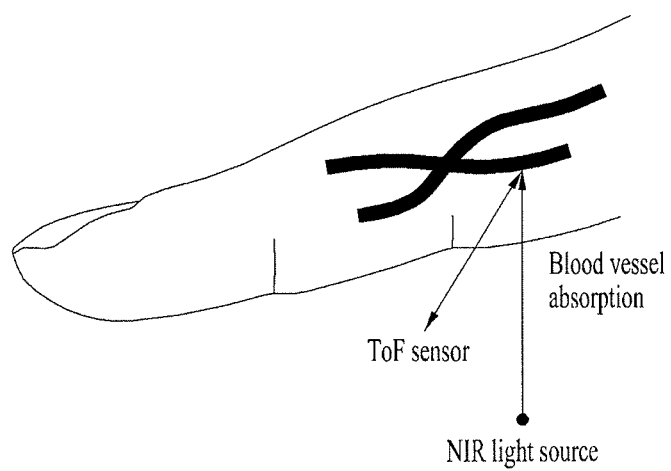
Figure 11:
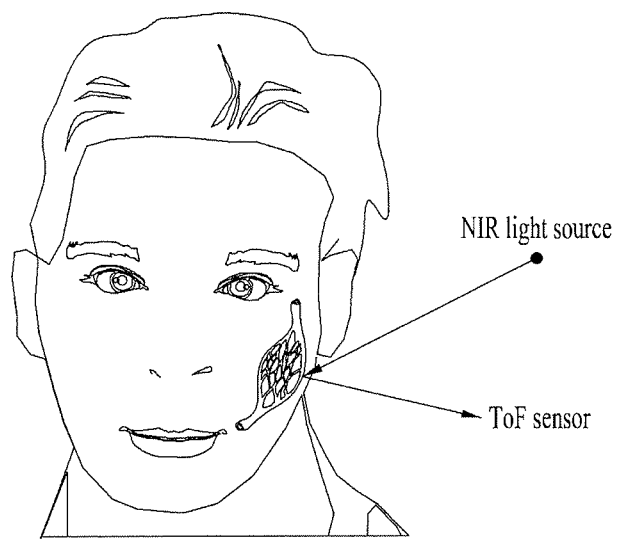

FIG. 9 shows a process for extracting wrist vein pattern information by shooting a wrist vein image. FIG. 10 shows a process for extracting finger vein pattern information by shooting a finger vein image. FIG. 11 shows a process for extracting face vein pattern information by shooting a face vein image.

Figure 12:
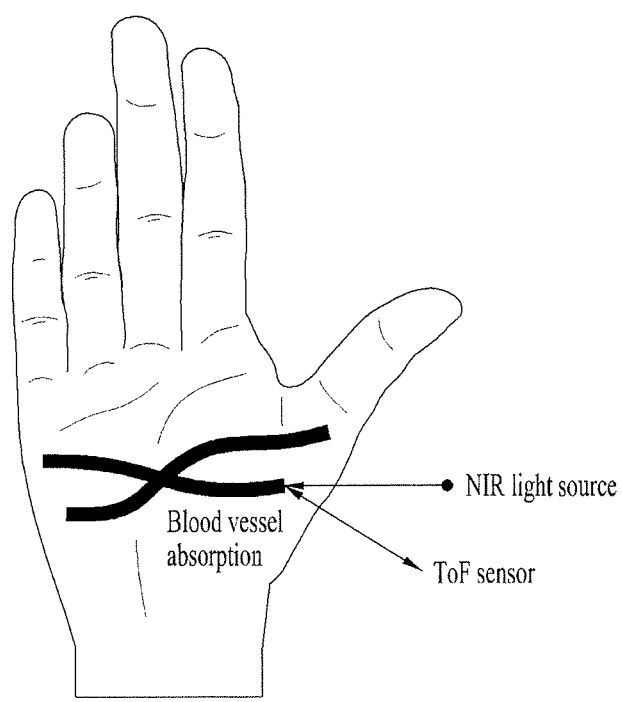
Figure 13:
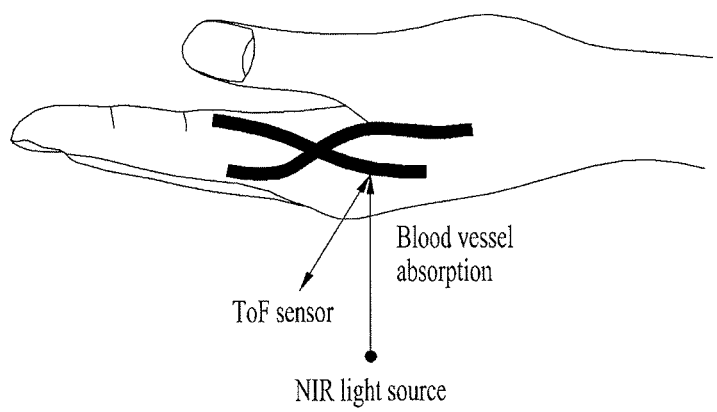
Figure 14:
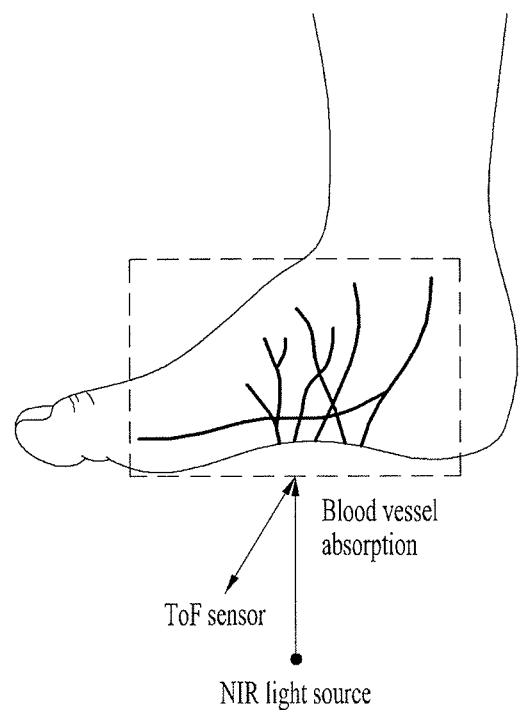

In addition, FIG. 12 shows a process for extracting palm vein pattern information by shooting a palm vein image. FIG. 13 shows a process for extracting hand dorsum vein pattern information by shooting a hand dorsum vein image. And, FIG. 14 shows a process for extracting foot vein pattern information by shooting a foot vein image.

Therefore, the present invention can perform a first embodiment of performing both face authentication (2D, 3D) and face vein authentication, a second embodiment of performing both face authentication (2D, 3D) and wrist vein authentication, a third embodiment of performing both face authentication (2D, 3D) and hand dorsum vein authentication, a fourth embodiment of performing both face authentication (2D, 3D) and finger vein authentication, a fifth embodiment of performing both face authentication (2D, 3D) and palm vein authentication, and a sixth embodiment of performing both face authentication (2D, 3D) and food vein authentication.

Therefore, according to one embodiment of the present invention, by performing both face authentication and vein authentication of a multitude of body parts according to a security level, security can be reinforced and accuracy can be raised. Further, the present invention can perform personal authentication with high accuracy by obtaining 3D vein blood vessel information through depth information of a ToF sensor, compensate the inaccuracy of the related art face recognition through additional vein authentication, and apply use scenes of various types.

FIGS. 15 to 22 are diagrams illustrating security authentication according to security levels. Referring to FIGS. 15 to 22, the present invention can perform various authentications according to security levels of an execution mode to be executed.

In one example, if a security level of an execution mode to be executed is low, the present invention can perform a primary authentication of comparing processed face image data with face image data previously stored in a memory only. In some instances, if a security level of an execution mode to be executed is middle, the present invention can perform both a primary authentication of comparing processed face image data with face image data previously stored in a memory and a secondary authentication of comparing vein image data of at least one processed body part with vein image data of at least one body part previously stored in the memory.

In other instances, if a security level of an execution mode to be executed is high, the present invention can perform a primary authentication of comparing processed face image data with face image data previously stored in a memory, a secondary authentication of comparing vein image data of at least one processed body part with vein image data of at least one body part previously stored in the memory, and a tertiary authentication of comparing vein image data of at least one processed different body part with vein image data of at least one different body part previously stored in the memory all.

The present invention checks a security level of an execution mode to be executed. If the checked security level is higher than a reference level, the present invention can perform both a primary authentication based on a face authentication image and a secondary authentication based on a vein authentication image of a body part.

Figure 15:
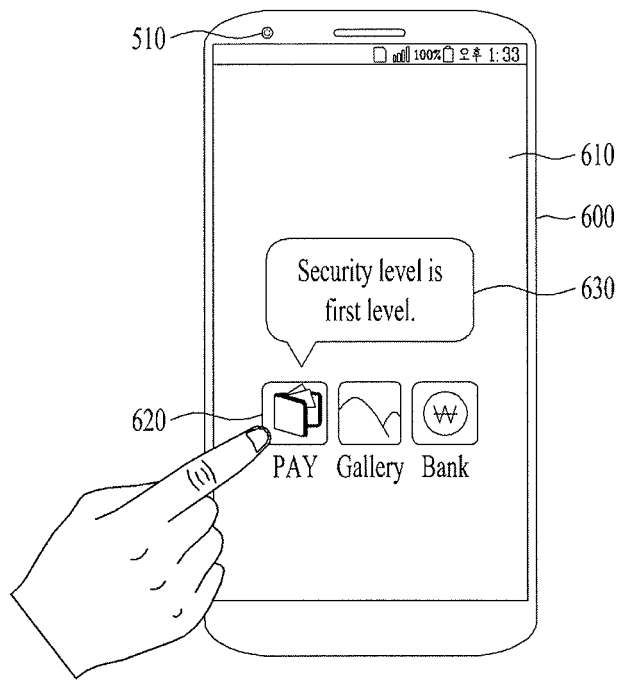
FIGS. 15 to 22 are diagrams illustrating security authentication according to security levels.

Referring to FIG. 15, if an execution mode to be executed is an electronic payment, a security level of the execution mode to be executed is checked in response to a user's touch to an electronic payment icon 620 and information on the checked security level can be provided as a notification message 630 to a display screen 610 of a digital device 600.

The present invention checks a security level of an execution mode to be executed. If the checked security level is lower than a reference level, the present invention can perform a primary authentication based on a face authentication image only.

Figure 16:
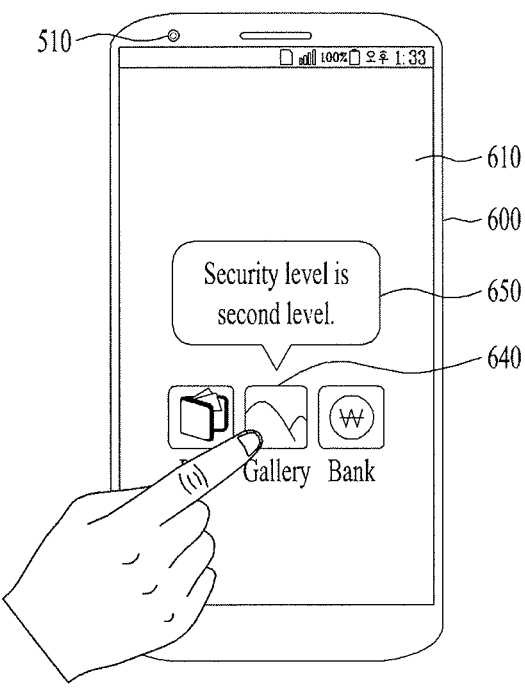

Referring to FIG. 16, if an execution mode to be executed is a photo gallery, a security level of the execution mode to be executed is checked in response to a user's touch to a photo gallery icon 640 and information on the checked security level can be provided as a notification message 650 to a display screen. The present invention checks a security level of an execution mode to be executed. If the checked security level is a special level, the present invention succeeds in both a primary authentication and a secondary authentication, requests an additional body authentication, controls the camera unit 510 to capture a body to be additionally authenticated, and then performs a tertiary authentication based on an additional body authentication image.

Figure 17:
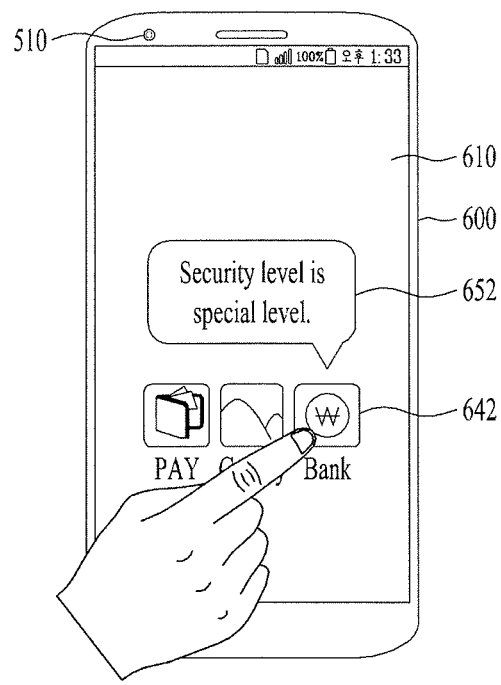

Referring to FIG. 17, if an execution mode to be executed is a bank transaction, a security level of the execution mode to be executed is checked in response to a user's touch to a bank transaction icon 642 and information on the checked security level can be provided as a notification message 652 to a display screen.

Figure 18:
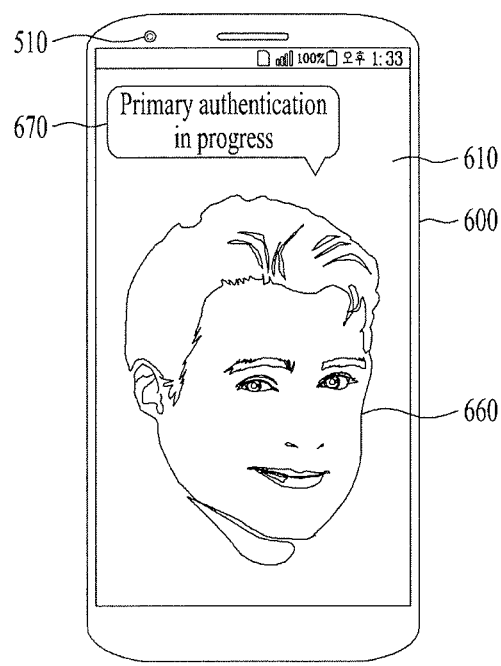
Figure 19:
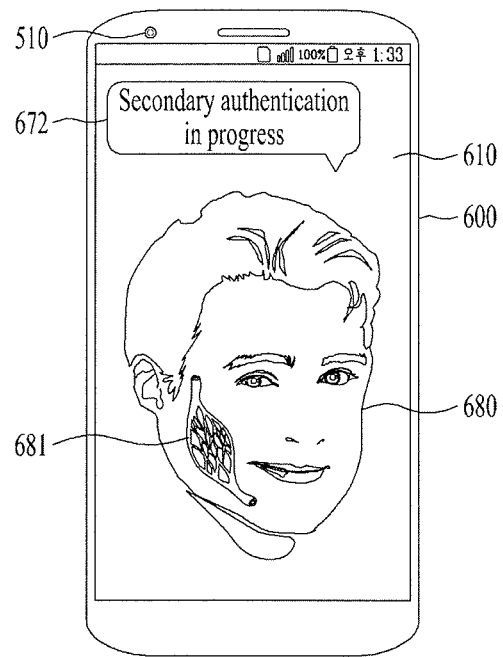

Referring to FIG. 18 and FIG. 19, when a primary or secondary authentication is performed, if it is in the middle of authentication, the present invention can provide a notification message 670/672, which indicates that authentication is in 'progress, to a display screen 610. A target 680 (face) and vein pattern 681 are also displayed.

Figure 20:
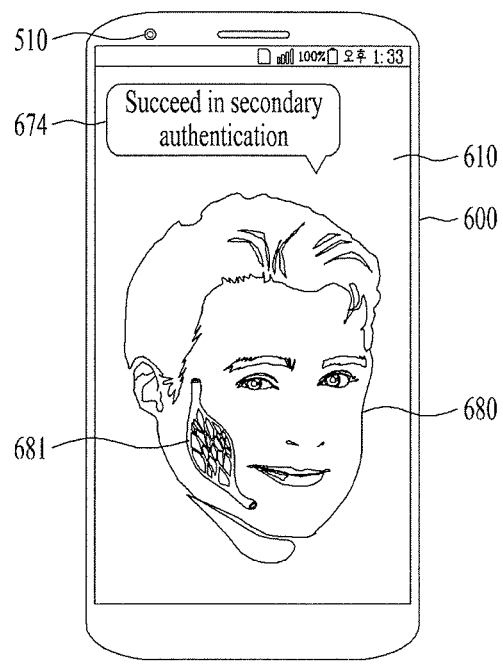
Figure 21:
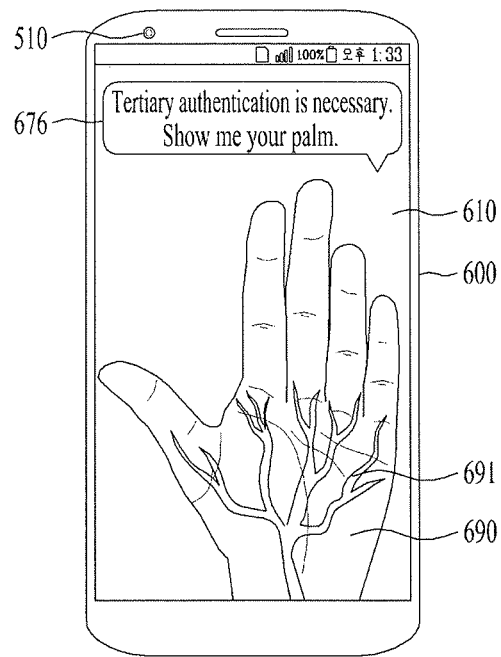

Referring to FIG. 20, if authentication is successful, the present invention can provide an authentication success notification message 674 to a display screen 610. Referring to FIG. 21, if authentication is successful, the present invention can provide a next step guide message 676 to a display screen 610. A target 690 (palm) and vein pattern 691 are also displayed.

Figure 22:
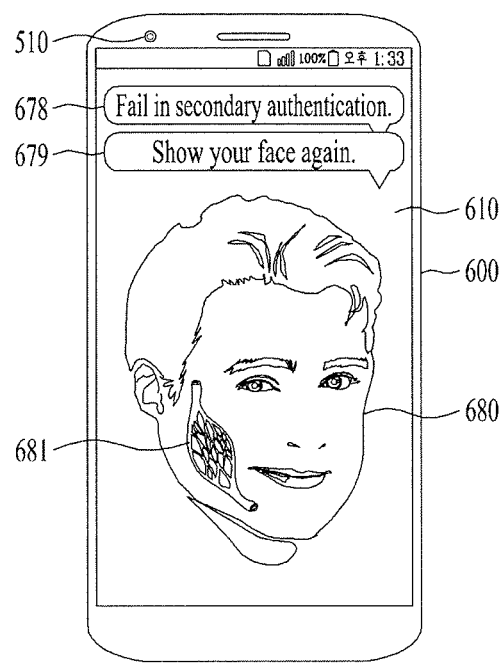

Referring to FIG. 22, when a primary or secondary authentication is performed, if it is authentication failure, the present invention can provide an authentication failure notification message to a display screen 610 and also provide a re-authentication guide message 679 to the display screen 610. A target 680 (face) and vein pattern 681 are also displayed.

Accordingly, the present invention can perform personal authentication quickly and conveniently by extracting a vein pattern of a body part by applying ToF (time of flight) employing a near infrared light source and then using the extracted vein pattern. And, the present invention can improve safety and reliability of security authentication by performing face authentication and vein authentication of a body part by applying ToF (time of flight) employing a near infrared light source.

Further, the present invention can reinforce security and raise accuracy by performing face authentication and vein authentication of multiple body parts according to a security level. Furthermore, the present invention can perform personal authentication with high accuracy by obtaining 3D vein blood vessel information through depth information of a ToF sensor, compensate the inaccuracy of the related art face recognition through additional vein authentication, and apply use scenes of various types.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A digital device, comprising:
a camera unit;
a display unit; and
a controller configured to:
in response to a request to execute a first application on the digital device having a first security authentication level, control the camera unit to capture face image data of a target and perform a first authentication process by comparing the captured face image data with prestored face image data, and
in response to a request to execute a second application on the digital device having a second security authentication level more secure than the first security authentication level, control the camera unit to capture vein image data of a particular body part of the target, and perform the first authentication process and a second authentication process by comparing the captured vein image data with prestored vein image data,
wherein the second authentication is performed using face vein image data extracted from the captured face image used in the first authentication, without separate shooting,
wherein the camera unit comprises:
a light emitting unit including a near infrared light source configured to emit near infrared light to the target, and a color light source configured to emit color light to the target; and
a light receiving unit configured to detect lights reflected from the target,
wherein the light receiving unit comprises:
a lens unit configured to transmit and focus the lights reflected from the target;
a filter unit configured to only transmit infrared light from the focused lights reflected from the target; and
a detecting unit configured to detect the infrared light filtered by the filter unit, and
wherein the controller is further configured to move the lens unit centering on the detecting unit in response to an auto focus control signal.

2. The digital device of claim 1, wherein the controller is further configured to use the near infrared light source when capturing the vein image data.

3. The digital device of claim 1, wherein the controller is further configured to only compare the captured face image data with the prestored face image data in the first authentication process.

4. The digital device of claim 1, wherein the controller is further configured to:
in response to a request to execute a third application on the digital device having a third security authentication level more secure than the second security authentication level, control the camera unit to capture additional vein image data of an additional particular body part of the target, and perform the first and second authentication processes and a third authentication process by comparing the captured additional vein image data with prestored additional vein image data for the additional particular body part.

5. The digital device of claim 4, wherein the first application corresponds to a payment service, the second application corresponds to a gallery application, and the third application corresponds to a banking application.

6. The digital device of claim 1, wherein the captured vein image data comprises at least of face vein image data, wrist vein image data, hand dorsum vein image data, finger vein image data, palm vein image data, and foot vein image data.

7. The digital device of claim 1, wherein the controller is further configured to:
in response to a touch input of an application icon on the display unit, display information about a security authentication level of an application corresponding to the application icon.

8. The digital device of claim 1, wherein the controller is further configured to:
display an authentication success notification message and a next step guide message on the display unit in response to a successful first authentication process and a successful second authentication process, respectively.

9. The digital device of claim 1, wherein the controller is further configured to:
display an authentication failure notification message and re-authentication message on the display unit in response to an unsuccessful first authentication process and an unsuccessful second authentication process, respectively.

10. A method of controlling a digital device, the method comprising:

in response to a request to execute a first application on the digital device having a first security authentication level, controlling a camera unit of the digital device to capture face image data of a target and performing a first authentication process by comparing the captured face image data with prestored face image data; and in response to a request to execute a second application on the digital device having a second security authentication level more secure than the first security authentication level, controlling the camera unit to capture vein image data of a particular body part of the target, and performing the first authentication process and a second authentication process by comparing the captured vein image data with prestored vein image data, wherein the second authentication is performed using face vein image data extracted from the captured face image used in the first authentication, without separate shooting, wherein the camera unit comprises:

a light emitting unit including a near infrared light source configured to emit near infrared light to the target, and a color light source configured to emit color light to the target; and a light receiving unit configured to detect lights reflecting from the target, wherein the light receiving unit comprises:

a lens unit configured to transmit and focus the lights reflected from the target;

a filter unit configured to only transmit infrared light from the focused lights reflected from the target; and a detecting unit configured to detect the infrared light filtered by the filter unit, and wherein the method further comprises moving the lens unit centering on the detecting unit in response to an auto focus control signal.

11. The method of claim 10, further comprising:

using the near infrared light source when capturing the vein image data.

12. The method of claim 10, further comprising only comparing the captured face image data with the prestored face image data in the first authentication process.

13. The method of claim 10, further comprising:

in response to a request to execute a third application on the digital device having a third security authentication level more secure than the second security authentication level, controlling the camera unit to capture additional vein image data of an additional particular body part of the target, and performing the first and second authentication processes and a third authentication process by comparing the captured additional vein image data with prestored additional vein image data for the additional particular body part.

14. The method of claim 13, wherein the first application corresponds to a payment service, the second application corresponds to a gallery application, and the third application corresponds to a banking application.

* * * * *